United States Patent
Ross

(10) Patent No.: US 7,370,874 B1
(45) Date of Patent: May 13, 2008

(54) LIGHT-WEIGHT PIVOTING FRAME FOR BICYCLES/UNICYCLES/TRICYCLES

(76) Inventor: Charles W Ross, P.O. Box 391, Hornersville, MO (US) 63855

( * ) Notice: Subject to any disclaimer, the term of this patent is extended or adjusted under 35 U.S.C. 154(b) by 261 days.

(21) Appl. No.: 11/137,211

(22) Filed: May 24, 2005

Related U.S. Application Data

(60) Provisional application No. 60/573,936, filed on May 25, 2004.

(51) Int. Cl.
*B62K 27/12* (2006.01)

(52) U.S. Cl. ...................... 280/292; 280/204

(58) Field of Classification Search ............... 280/292, 280/408, 409, 411.1, 412, 413, 204
See application file for complete search history.

(56) References Cited

U.S. PATENT DOCUMENTS

| | | | | |
|---|---|---|---|---|
| 667,154 | A | * | 1/1901 | McDonald et al. ......... 280/292 |
| 704,871 | A | * | 7/1902 | Davis ......................... 280/292 |
| 6,050,580 | A | * | 4/2000 | Pawelek ...................... 280/204 |
| 6,270,100 | B1 | * | 8/2001 | Wunderlich .................. 280/204 |
| 2003/0178806 | A1 | * | 9/2003 | Nelson ....................... 280/204 |

* cited by examiner

*Primary Examiner*—Christopher P. Ellis
*Assistant Examiner*—Maurice Williams

(57) ABSTRACT

A light-weight mechanical frame an accessory for harnessing together a multiple of bicycles, unicycles, tricycles or other human-powered vehicles and toys, consisting of a center-of-frame 360° horizontal pivot with four or more unequal length arms radiating horizontally outward therefrom FIG. 1. At each arm, member, outer extremity extend lineally downward legs. Although the legs can descend at any angle, at their extreme lower ends are verticle axels, or pintles which are 360° pivoting connections for the cycles. Cycles thus mounted to a frame are harnessed and interconnected into symbiotic action capable of executing intricate riding patterns. Lone cycle riding becomes a team effort, all for one and one for all. The frame and cycles cannot start, turn or stop without coordinated teamwork—and leadership. The frame can be used by all ages and abilities, from extreme sporters to family outings where toddlers cycle can inter-connect with bigger siblings and parents cycles to socializing, touring and excercising seniors. The whole rig resembles a huge spider clutching cycles by the nap of their necks. Of course the unicycle frame is much shorter, requiring much less operating space and is more maneuverable.

1 Claim, 7 Drawing Sheets

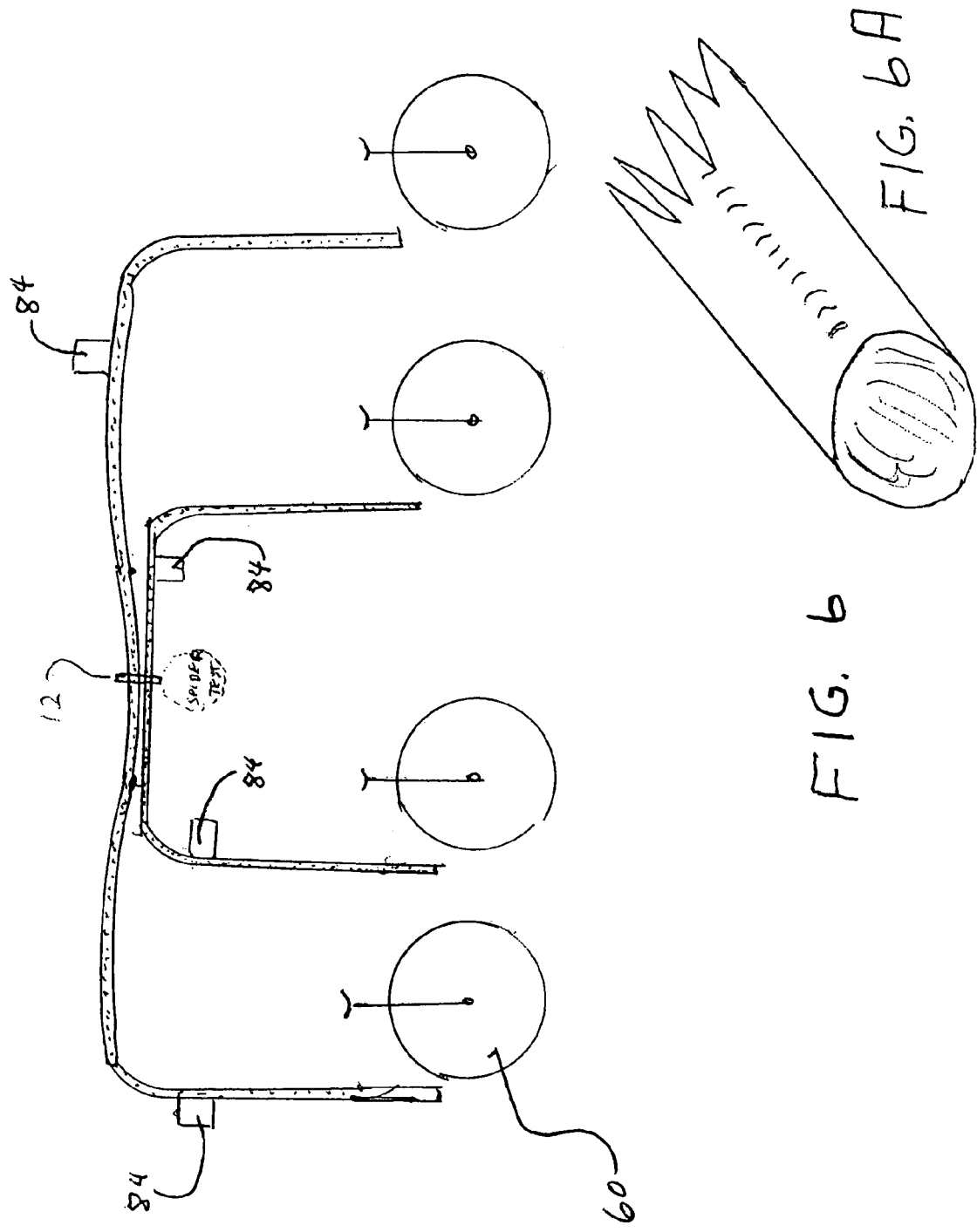

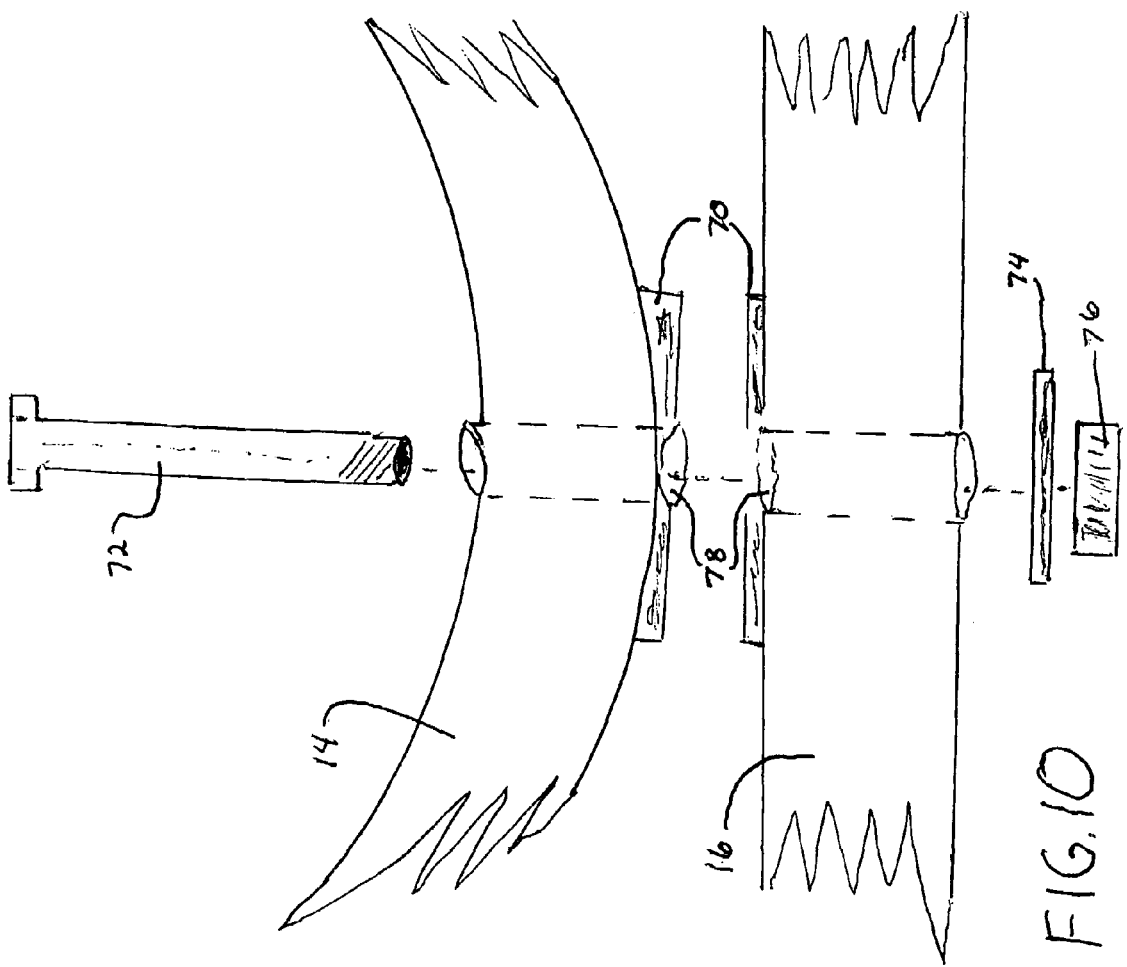

LIGHT-WEIGHT PIVOTING FRAME FOR BICYCLES/UNICYCLES/TRICYCLES

CROSS REFERENCE TO RELATED APPLICATIONS

This application claims the benefit of provisional patent application Ser. No. 60/573,936, filed May 25, 2004 by the present inventor.

FEDERALLY SPONSERED RESEARCH

Not applicable.

SEQUENCE LISTING OR PROGRAM

Not applicable.

BACKGROUND OF THE INVENTION

1. Field of Invention
This invention relates as accessory to bicycles/unicycles/tricycles.
2. Prior Art
None known as relates to bicycle/unicycle/tricycle accessory.

OBJECTS AND ADVANTAGES

The object of this invention is a unique capture, a harnessing together of two, three, four or more cycles so they operate as a single symbiotic unit.

The advantage of this single unit operation is that children, and adults, heretofore accustomed to an archic lone riding come together to function as a team. They can conceive and then execute all sorts of synchronized riding patterns.

Hence children learn joys and values of teamwork and leadership choreographing and executing interesting riding stunts possible via this invention.

Since the invention can be used interchangably for kid-sized cycles, adult-sized larger cycles or the type of tricycles on which seniors typically tour and exercize, a single frame embodied in this invention serves a whole family.

Young families can embark on riding outings whereon youngsters enjoy confidence building pseudo-independence on their own small mounts, yet are fully at the beck of parent son their larger cycles—all on the same frame at the same time.

Elders who normally ride alone on their tricycles or lonely stationary machines—and thus so often procrastinate getting out—can form a team, a social club of riders, pride of social obligation prodding them to keep riding dates for mutual benefit of enhanced fitness and fun.

Since at least three of any size rider are needed for optimum operation of the invention, a fourth position can be taken as tetherpost for a pet or pets—or as a place for a cute sign advertizing for a cute new rider.

A frame can be satisfactorily transported by only two riders to a location of additional riders. Identity tags can attach to frame members FIG. 6, 84.

DRAWING FIGURES

Figure 1:
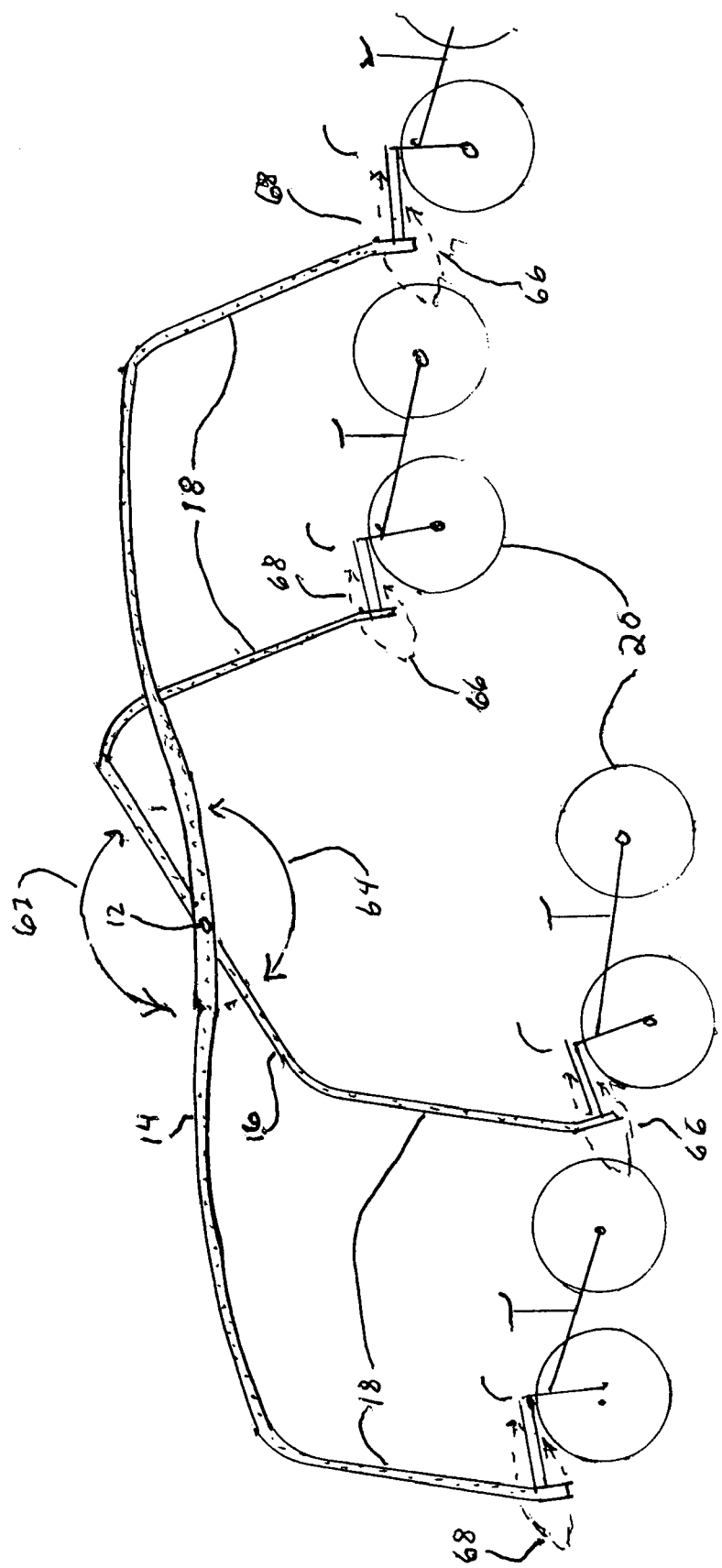
Figure 2:
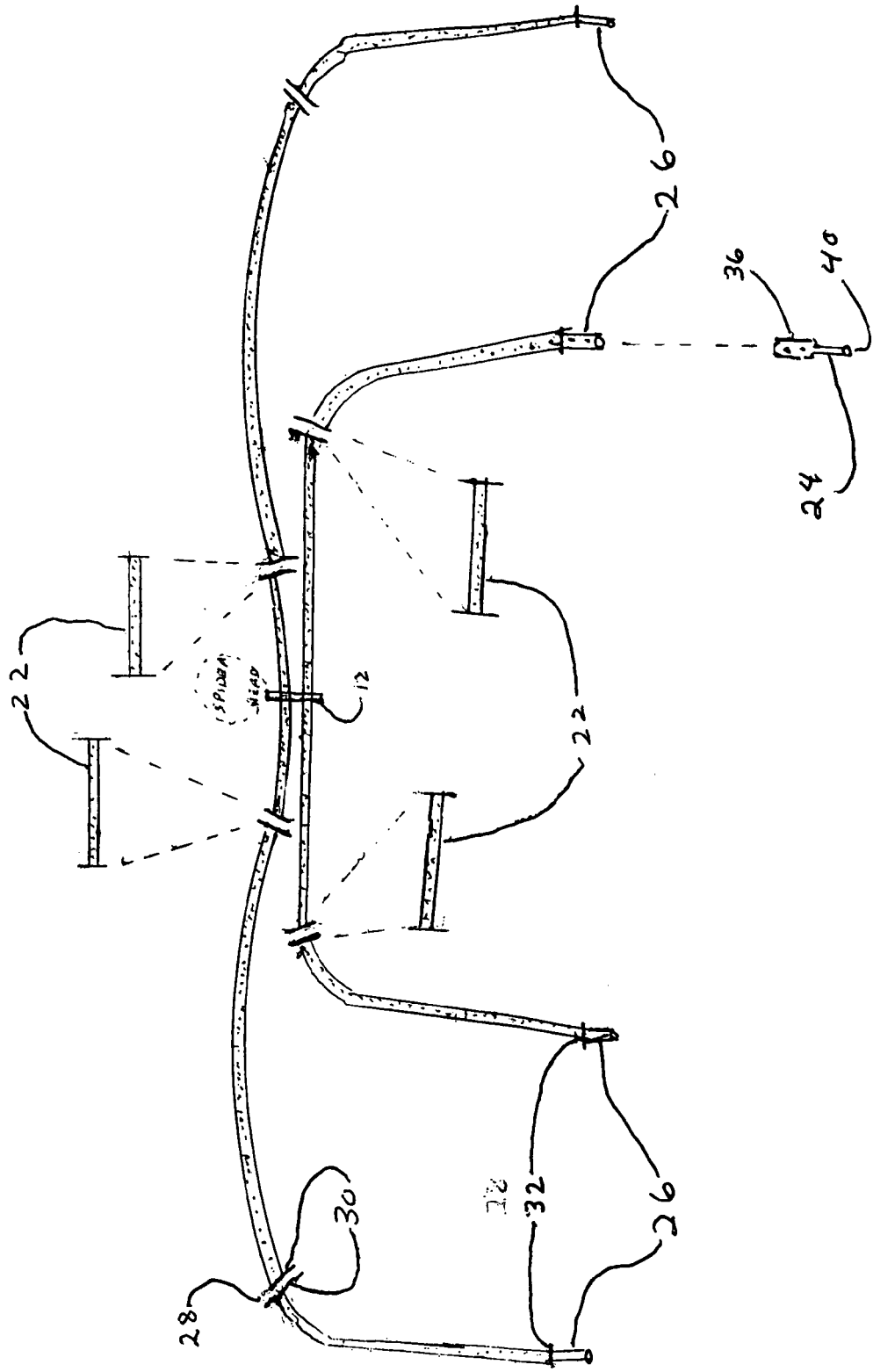
Figure 4:
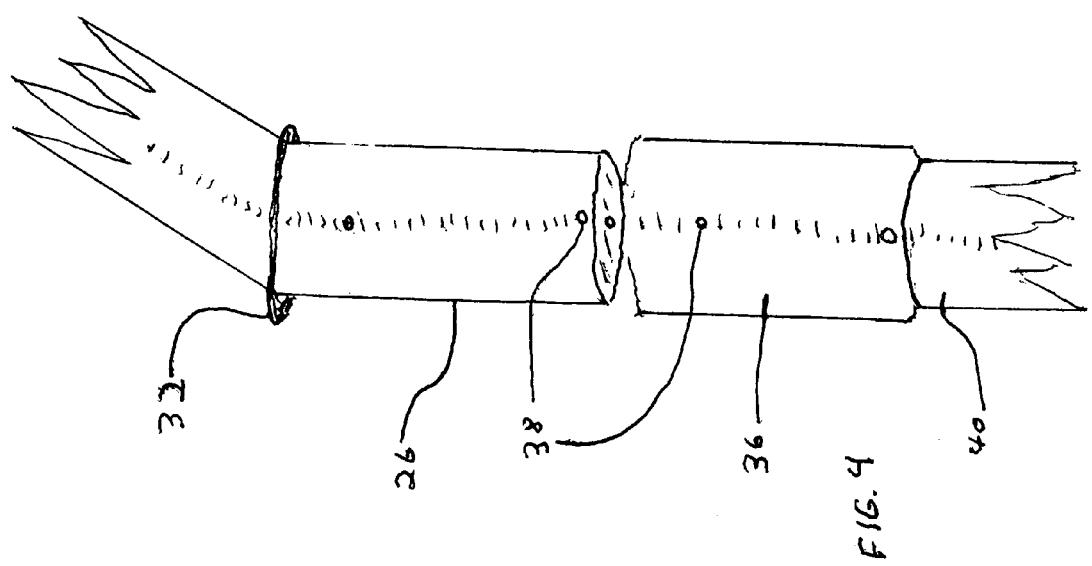
Figure 3:
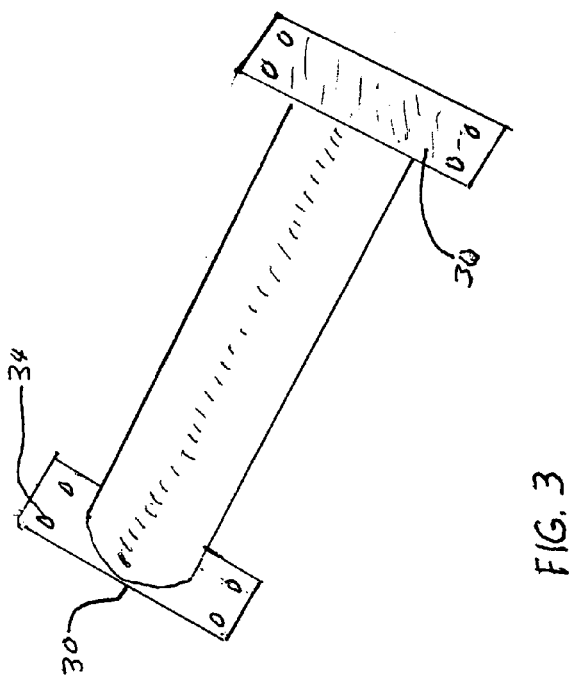
Figure 8:
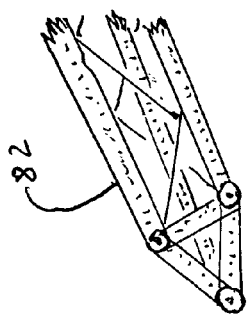
Figure 9:
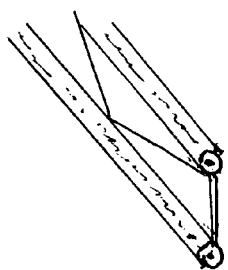
Figure 7:
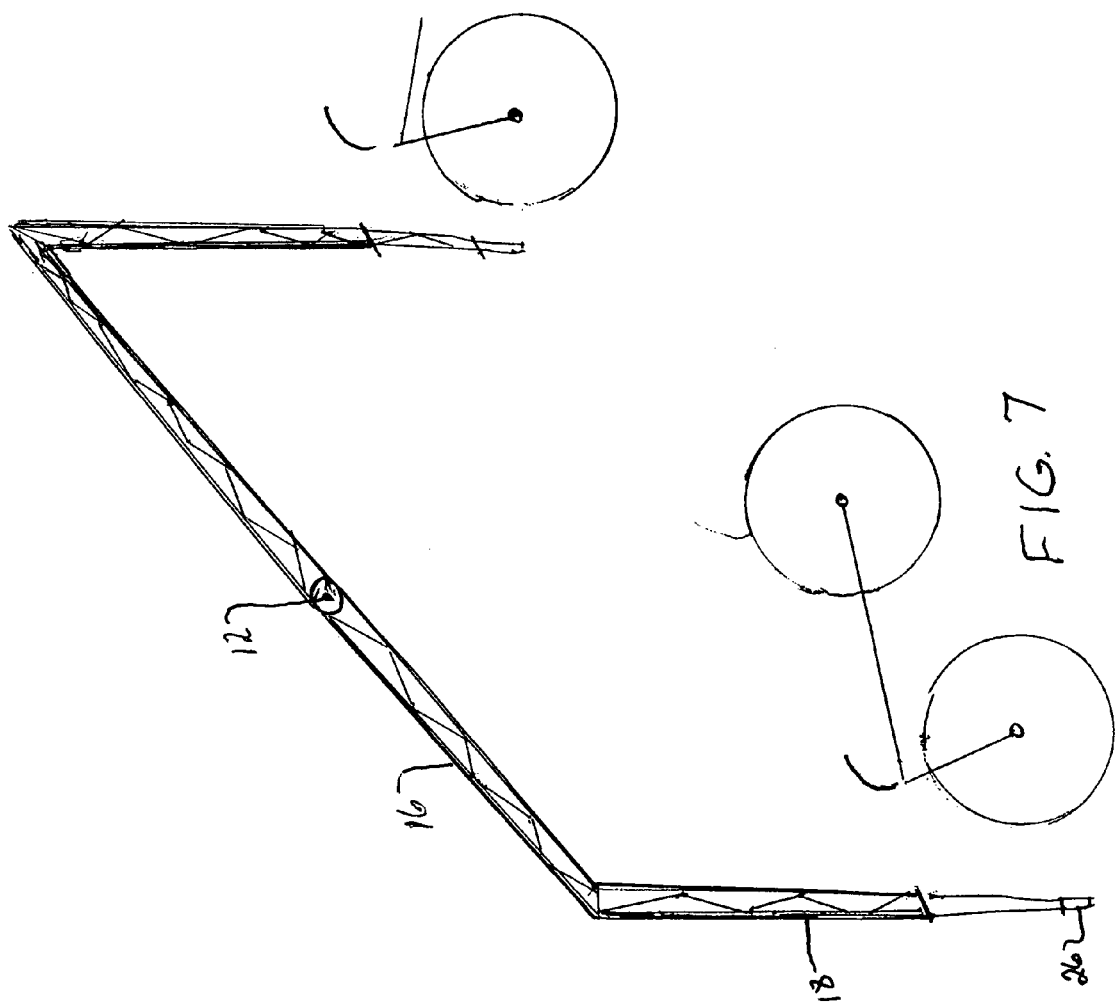

FIG. 1 Three quarter view of frame (with bicyles)
FIG. 2 Side view of sectioned frame with horizontal and vertical extensions.
FIG. 3 Detail of frame extension insert
FIG. 4 Detail of vertical leg extension insert
FIG. 5 Detail of bracket connecting lower frame leg to cycles
FIG. 6 Side view of unicycles single file on abbreviated frame
FIG. 6A End view of single piece lone tubular strut frame structural members
FIG. 7 View of built-up truss type frame member
FIG. 8 End view of triangular truss, derrick-style
FIG. 9 End view of flat truss
FIG. 10. Detail of midpoint pivot frame members connection.

DETAILED DISCRIPTION

Preferred embodiments FIGS. 1 through 7

The preferred embodiment of the present invention is an utterly simple skeletal frame apparatus of at least two unequal length hollow sticks pivot connected at their respective midpoints FIG. 1, 12, FIG. 10. The outer ends of the sticks, or structural members, are bent out of whole stock or fabricated in sections FIG. 2 lineally downward to form the frame legs FIG. 1, 18. These formed legs terminate at their lower ends as pintles FIG. 2, 26. These pintles are the mounting points for the wheeled human powered vehicles, usually but not limited to cycles.

Figure 5:
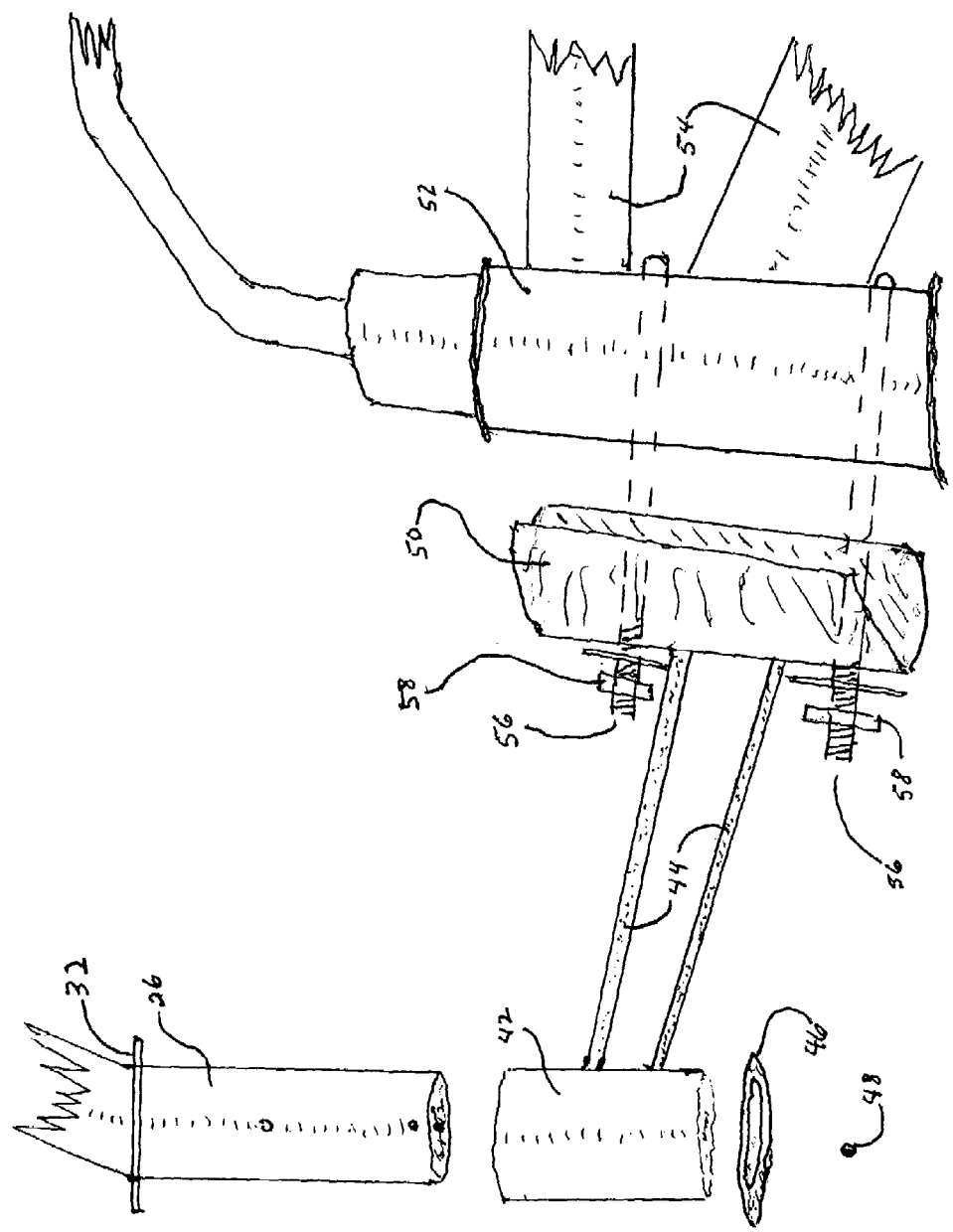

Cycle mount to the frame is accomplished via a bracket FIG. 5. The bracket forepart is a socket 42 to receive a frame leg pintle FIG. 5, 26 forming a 360° pivot FIG. 1, 66, 68. The aft part of the bracket is a half-round plate 50 bolted solidly to a cycle yoke-handlebar bearing housing FIG. 52 with U-bolts FIG. 56. The socket and mounting plate connect by a web 44 to form the completed bracket.

A fixed annulated rim 32 marks the upper end of a pintle and prevent the bracket socket slippage upward. Likewise a flat washer 46 and pin 48 restrain downward slippage.

At this stage of construction of the frame resembles a huge bug or spider with its long fore-and-aft member and short crossmember. Exaggerated functional overshaping can create cosmetic enhancement of this effect FIGS. 1, 2, 6. The most prominent feature of the frame body is the fore-and-aft member with its crossmember pivot connected. The frame body dimensions can be of sufficient length for the four mounted cycles to go in line, single file, without touching and high enough that riders heads don't touch when passing uner crossmembers.

The preferred frame member consists, from pintle to pintle, of just one lone lineal stick of stock. The material of this stock must therefore combine characteristics of strength sufficient to support the cycles upright under the load and motion of the cycle riders, yet of light enough weight not to overburden the riders as in accessory. Hence material choices, considering qualities of economy, weight and strength can include mid carbon steel, aluminum, chromolly, plastics, composites, fiberglass and more. They should also include some limberness, as in a heavy fish pole and for the same reason.

The frame design has many applications from the needs of high-spirited young extreme performance to more sedate senior cruisers. A happy medium serving most users is a simple tubular mild carbon steel of about 11 to 12 gauge dimension.

Because cycles come in different lengths and heights and since different sized cycles may be mounted on the same frame at the same time, the invention provides quick and easy horizontal length extensions FIG. 2, 22 and vertical extension inserts 24. Frame piece sections, inserts fay-join with bolts FIG. 3.

The frame has many applications as accessory for human powered wheeled vehicles among nearly all age groups; but the fundamental operating principle for all, the essense of the invention as a cycle accessory is: synchronized symbiotic movement of all cycles attached to it, the mechanical inter-connection of a multiple of cycles to function as one.

OPERATION

Preferred embodiment

This invention is cycle dependent. Bud riding attached to the frame is altogether unlike ordinary cycle riding. The frame cannot start, stop or turn without leadership and teamwork by all. This challenge is irresistable to many, young and older.

With experience a team can choreograph and execute numerous riding pattern stunts based on parabolic, eschelon, breast, single file movements and more. With experience and care the frame can go many places where cycles go.

DISCRIPTION

Alternate embodiment

Where the preferred embodiment of this invention is as a frame whereby its members radiate outward from a pivot as four single tubular struts. FIG. 6A, unsupported except by their own inherent strength FIGS. 1,2,6, an alternate configuration of a structural member is a a built-up truss FIG. 7, 8, 9 derrick-style.

CONCLUSION

Ramifications and scope of the invention

The reader has seen above the applicable wide scope of use for this invention as a cycle accessory—as to diverse age and abilities of users, diverse, diverse types of cycle, and other toys use.

I have not mentioned, but would not have the reader miss, the plethora of possible extreme users of a perhaps modified frame:

as accessory to, water skis snow skis and sleds light (or other) motorized cycle and 4-wheelers sky divers skate boards roller skates and there is no limit to the length of a fore-and-aft member; it could stretch the length of a football field with unlimited numbers of cross members appropriately placed with cycles attached.

The scope of the invention should be determined by the appended claims and their legal equivalents, and not by examples given in conclusion.

I claim:

1. A light-weight mechanical device as accessory means for simultaneously interconnecting and synchronizing the movement of a plurality of human powered vehicles when attached thereto, comprising:

A frame of at least two hollow members of unequal lengths, each having a horizontal portion with a leg at each end, the hollow members are attached crosswise to one another at their respective midpoints by a vertical bolt passing through bushings in each member to rotate 360 degrees relative to the other on a horizontal plane, a mounting assembly placed on the end of each leg of the hollow members, the mounting assembly comprising:

a half-round mounting plate bolted to a front wheel yoke of each human powered vehicle, a bracket socket connected to the mounting plate by a bracket web, and a pintle installed in the bracket socket.

* * * * *